(12) United States Patent
Tan et al.

(10) Patent No.: US 6,506,304 B2
(45) Date of Patent: Jan. 14, 2003

(54) METHOD FOR THE REGENERATION OF SUPERCRITICAL EXTRACTANT

(76) Inventors: Chung-Sung Tan, Department of Chemical Engineering, National Tsing Hua University, Hsinchu (TW), 300; Yu-Wen Chiu, Department of Chemical Engineering, National Tsing Hua University, Hsinchu (TW), 300

( * ) Notice: Subject to any disclaimer, the term of this patent is extended or adjusted under 35 U.S.C. 154(b) by 120 days.

(21) Appl. No.: 09/824,096

(22) Filed: Apr. 3, 2001

(65) Prior Publication Data

US 2002/0139749 A1 Oct. 3, 2002

(51) Int. Cl.[7] .............................................. B01D 61/00
(52) U.S. Cl. ........................ 210/644; 210/651; 210/652; 95/45; 95/51; 426/422; 426/424; 426/427; 426/442
(58) Field of Search ................................ 210/644, 651, 210/652, 500.25; 426/422, 424, 427, 442; 95/43, 45, 51

(56) References Cited

U.S. PATENT DOCUMENTS

| | | | |
|---|---|---|---|
| 4,911,941 A | * | 3/1990 | Katz et al. |
| 4,996,317 A | * | 2/1991 | O'Brien et al. |
| 5,266,342 A | * | 11/1993 | Spence et al. |
| 5,492,838 A | * | 2/1996 | Pawliszyn |
| 5,591,345 A | * | 1/1997 | Eugelen et al. |
| 5,639,375 A | * | 6/1997 | Hirosi |
| 5,961,835 A | * | 10/1999 | Serrade et al. |

* cited by examiner

*Primary Examiner*—Ana Fortuna
(74) *Attorney, Agent, or Firm*—Bacon & Thomas, PLLC

(57) ABSTRACT

A method for recovering supercritical extractant, such as supercritical $CO_2$, from a mixture containing the supercritical extractant and a solute is disclosed, which includes contacting the mixture with a molecular sieve membrane at a temperature and a pressure in a critical region of the extractant and near a critical point of the extractant so that a permeate rich in the extractant and a retentate having a enriched concentration of the solute in the extractant are generated. The molecular sieve membrane has a pore size significantly larger than a size of the extractant provided that the pore size is less than and close to sizes of clusters formed of the solute and the extractant at the temperature and the pressure.

17 Claims, 5 Drawing Sheets

METHOD FOR THE REGENERATION OF SUPERCRITICAL EXTRACTANT

FIELD OF THE INVENTION

The present invention is related to a method for re-generating supercritical extractant, and in particular a method for re-generating supercritical $CO_2$.

BACKGROUND OF THE INVENTION

Because supercritical carbon dioxide ($SCCO_2$) possesses several unique characteristics and physicochemical properties, such as being nontoxic, nonflammable, inexpensive, and having the extraction power tuned by temperature and pressure, and a higher mass transfer rates than conventional organic solvents, it has been used as a green solvent for decaffeination and extraction of flavors processes. Due to that the solubility of a solute in supercritical carbon dioxide is relatively low and increases with pressure, the operation pressure required is generally high and a large quantity of carbon dioxide is needed. To make an extraction process more economic, regeneration of supercritical carbon dioxide for cycling use is essential.

Several regeneration techniques including reduction of pressure, adsorption, absorption, and membrane have been investigated. Though the simplest means for regeneration of supercritical carbon dioxide is to reduce pressure to causing a phase separation, the energy required to recompress the expanded gas is usually high. While an isobaric and/or isothermal operation to remove solute from a $SCCO_2$ mixture may be possible with adsorption or absorption, a proper adsorbent or absorption solvent is not easy to obtain and solute cannot be completely removed in general. Besides a further treatment of adsorbent or absorption solvent is needed. When the size sieving is considered as the major mechanism in a membrane separation process, a membrane with a desired pore size distribution is definitely needed. Generally the difference in molecular sizes between carbon dioxide and the solute loaded is not in a large extent, a proper selection of pore size therefore needs to pay attention to. It was known that the molecular sieving mechanism may be applied to obtain a completely pure $SCCO_2$ if a membrane with the pore size sufficiently close to that of $CO_2$ can be synthesized. However, the use of this membrane inevitably causes the permeation flux of $SCCO_2$ decrease due to the small pore size thereof.

SUMMARY OF THE INVENTION

The present invention discloses a method for re-generating supercritical extractant from a mixture containing said supercritical extractant and a solute in said supercritical extractant, which comprises contacting said mixture with a molecular sieve membrane at a temperature and a pressure in a critical region of said extractant and near a critical point of said extractant so that a permeate rich in said extractant and a retentate having a enriched concentration of said solute in said extractant are generated, wherein said molecular sieve membrane has a pore size significantly larger than a size of said extractant provided that said pore size is less than and close to sizes of clusters formed of said solute and said extractant at said temperature and said pressure.

Preferably, said extractant is $CO_2$.

Preferably, said solute is selected from spices, hops, pesticides or caffeine, and more preferably caffeine.

Preferably, said molecular sieve membrane has a pore size about 1–5 nm.

Preferably, said temperature is of 30–50° C. and said pressure is of 7.0–9.5 MPa.

Preferably, a pressure drop across said molecular sieve membrane during said contacting is of about 0.1–0.8 MPa.

Preferably, a solute rejection defined as $(C_{feed}-C_{permeate})/C_{feed}$ is greater than 0.8, and more preferably, greater than 0.9, wherein said $C_{feed}$ is a concentration of said solute in said mixture and said $C_{permeate}$ is a concentration of said solute in said permeate.

DETAILED DESCRIPTION OF THE PREFERRED EMBODIMENTS

In the present invention a method of re-generating supercritical extractant, such as supercritical $CO_2$, having a high solute rejection and a high permeation flux of the supercritical extractant is disclosed. The supercritical extractant is re-generated under a temperature and a pressure near the critical point of the extractant, forming clusters of said solute and said extractant, so that a molecular sieving mechanism can be applied by choosing a membrane having a pore size greater than that of the extractant, and thus a high solute rejection and a high permeation flux of the supercritical extractant can be achieved. Preferably, the membrane does not substantially absorb or adsorb to the extractant, or the absorption and the adsorption do not adversely affect the passage of the extractant in the membrane. In one of the preferred embodiments of the present invention, a membrane to be used in re-generating supercritical $CO_2$ has a desired pore size of about 1–5 nm, which is much greater than 0.33 nm, the kinetic diameter of $CO_2$ and slightly smaller than the size of the clusters in order to cause a steric exclusion and to avoid a large diffusion resistance in pores. The term "pore size" of a membrane used in the present invention means an average pore size, and the membrane has a desired narrow pore size distribution.

Experimental

Caffeine with a MW of 194 and a purity of 99% was purchased from Lancaster Synthesis Ltd. It was used as received. The molecular size of a caffeine molecule is calculated by the software MSI Cerius2 as 0.7×0.8×0.4 nm.

Carbon dioxide with a purity of 99% was purchased from Char Ron Co. (Hsinchu, Taiwan). Two kinds of commercial membranes were used in this invention. One was a flat sheet polycarbonate membrane with an average pore size of 10 nm. (Poretics Co., 038044). This membrane was placed on a porous sintered stainless steel support in a membrane holder (Millipore Co., XX4504700). The upper and lower chambers were ca 4.4 ml each. The other was a nanofilter denoted as M5 having a thin layer of $ZrO_2$-$TiO_2$ with an average pore size of 3 nm on the substrate carbon (Tech-Sep Co.). This filter with an inside diameter of 6 mm, an outside diameter of 10 mm, and a length of 8.8 cm was placed in a tube with an inside diameter of 1.5 cm. This tube was functioned as a membrane holder.

Figure 1:
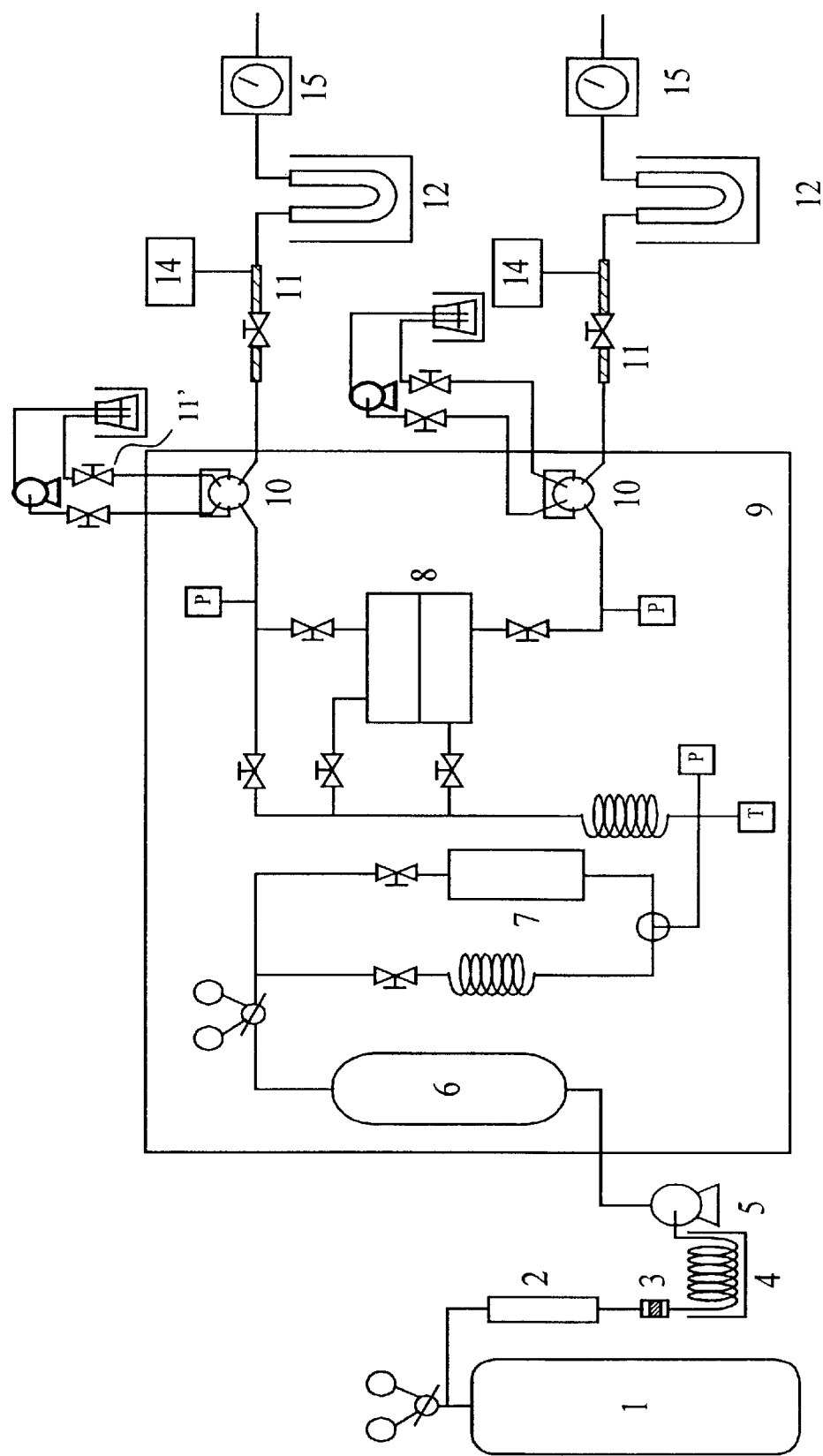
FIG. 1 is a schematic view of an apparatus for membrane separation suitable for use in the method of the present invention.

FIG. 1 illustrates the experimental apparatus for the membrane separation. The operation included two parts, one was for the extraction of caffeine by $SCCO_2$, and the other was for the separation of $SCCO_2$ from the mixture with membrane. Carbon dioxide was withdrawn from a carbon dioxide cylinder 1, passed through a zeolite 4A 2 and a filter 3, cooled with an ice bath 4, and pressurized by a mini pump 5 (Milton Roy, NSI33R), before it was stored in a surge tank 6 that was located in a constant temperature oven 9. The temperature of the oven 9 could be controlled to within ±0.5 K. The pressurized carbon dioxide then passed through a column (extractor) 7 packed with a mixture of 5.0 g caffeine powders and glass beads. Prior to enter the membrane holder 8, the effluent $SCCO_2$ stream of the extractor 7 was mixed with a fresh $SCCO_2$ stream in order to adjust the inlet concentration in the feed to the membrane. "T" and "P" in FIG. 1 stand for "thermocouple" and "pressure indicator", respectively. To determine the concentration of caffeine in the feed, the mixture bypassed the membrane holder 8 and samples of 1.0 mL collected by a six-port sampling valve 10 (Rheodyne Co.) were analyzed frequently. Before analysis the pressure of the mixture in the sampling loop was reduced via a metering valve 11' and a certain amount of water was used to flush the loop after expansion. The amount of caffeine precipitated in the loop was then determined by analyzing the concentration of caffeine in the flushing water with a UV detector (LDC, IS3200) (not shown in the drawing). The overall amount of caffeine extracted by $SCCO_2$ was also determined by collecting the precipitated caffeine in a cold trap 12 located downstream a metering valve 11 equipped with a thermo-controller 14, which was used to cause an expansion of the mixture. The total volume of the expanded $CO_2$ was determined by a wet test meter 15 (Ritter, TG5). From the measured gaseous volume and the amount of caffeine collected, the concentration of caffeine in the feed could also be determined. This concentration was found to be sufficiently close to that determined from the sampling loop. The deviation was no more than 3%.

When the concentration in the supercritical carbon dioxide stream reached a stable value, it was allowed to flow into the membrane holder 8. The concentrations of caffeine in the effluent streams from the upper chamber or the inner filter (retentate) and from the lower chamber or the outer filter (permeate) were analyzed in a similar manner as for the determination of the concentration in the feed. A steady state operation was observed to achieve after 1.5 h through monitoring the concentrations in the retentate and permeate.

Reproducibility tests were carried out at several operating conditions. It was found that the caffeine rejection and the $CO_2$ permeation flux could be reproduced within 3.0%. From the comparison of the overall mass of caffeine collected from the retentate and permeate with that from the feed, it was found that the amount retained in both membranes was negligible.

Result and Dissussions

With a proper flow rate of the $SCCO_2$ the concentration of caffeine in the effluent stream of the extractor was found to be sufficiently close to the saturated as reported in the literature. Under this situation the concentration of caffeine desired in the feed to the membrane could be obtained by mixing this effluent stream with a fresh $CO_2$ stream at a preset flow rate. In the Experimental the concentrations in the feed were set at least 20% below the saturated at each operating temperature and pressure. In all the runs, the caffeine rejection and $CO_2$ permeation flux were observed to maintain a relatively constant value within a at least six-hour operation after the steady state was reached indicating that the properties of the membranes did not alter during the operation.

Figure 2:
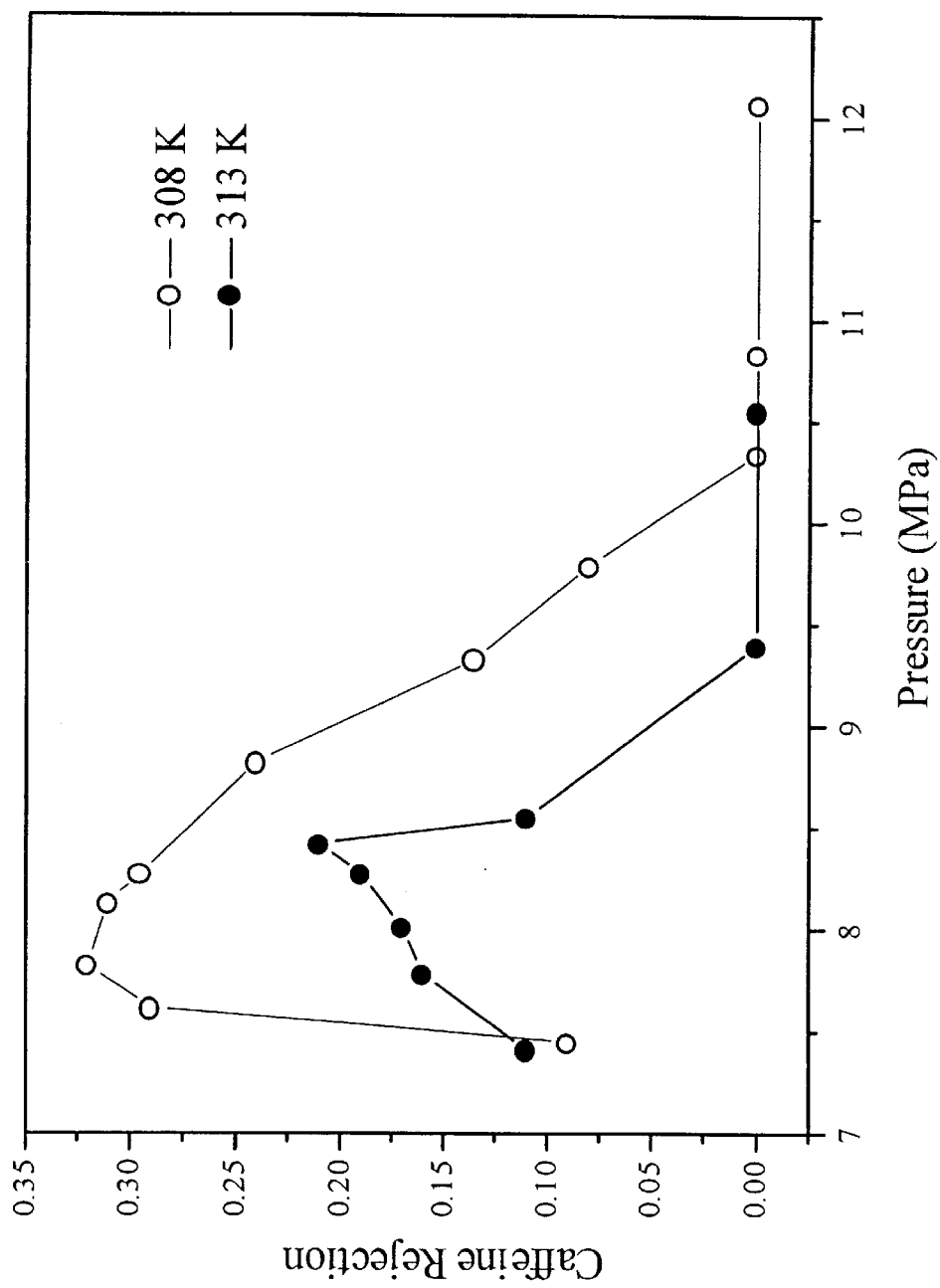
FIG. 2 is a plot showing a relationship between caffeine rejection and pressure using a flat sheet polycarbonate membrane having a pore size of 10 nm at 308 K (blank circle) and 313 K (round dot) according to the method of the present invention.
Figure 3:
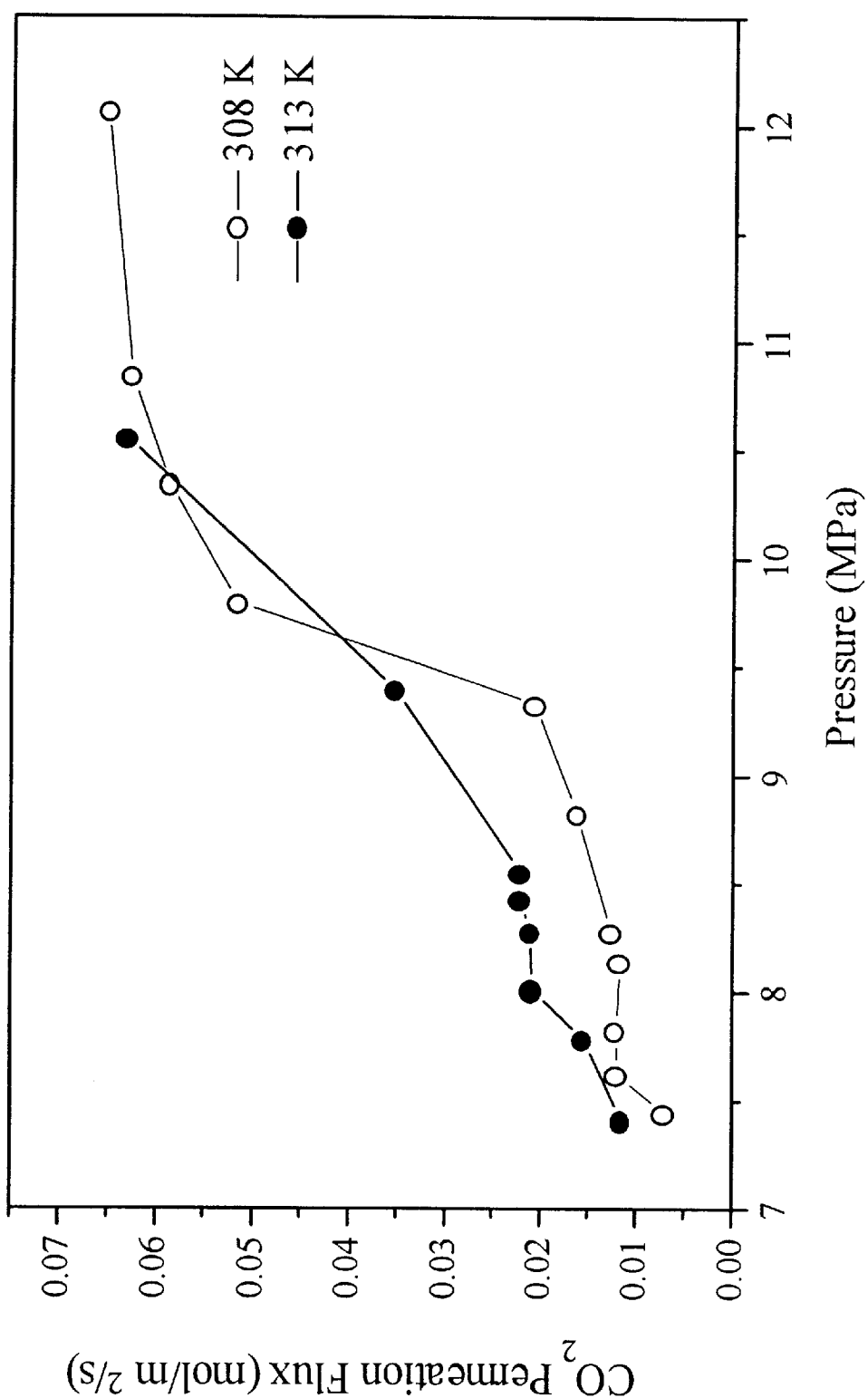
FIG. 3 is a plot showing a relationship between $CO_2$ permeation flux and pressure using a flat sheet polycarbonate membrane having a pore size of 10 nm at 308 K (blank circle) and 313 K (round dot) according to the method of the present invention.

When the flat sheet polycarbonate membrane was used, the caffeine rejection at different pressures for the temperatures maintained at 308 and 313 K and the transmembrane pressure $\Delta P$ fixed at 0.3 MPa are shown in FIG. 2. It can be seen that the highest caffeine rejection was about 0.32 that occurred at the operating condition of 308 K and 7.8 MPa which is near the critical point of $CO_2$ ($T_c$=304 K, $P_c$=7.38 MPa). It can also be seen from FIG. 2 that there existed a maximum caffeine rejection at each isothermal operation and the caffeine rejection decreased rapidly as the pressure departed from the critical pressure of $CO_2$. But it was not the case for the $CO_2$ permeation flux that was found to increase with pressure at both 308 and 313 K, shown in FIG. 3. Because of a poor caffeine rejection at all the operating temperatures and pressures, this kind of membrane is not suitable for the purpose of regeneration of supercritical carbon dioxide.

Figure 4:
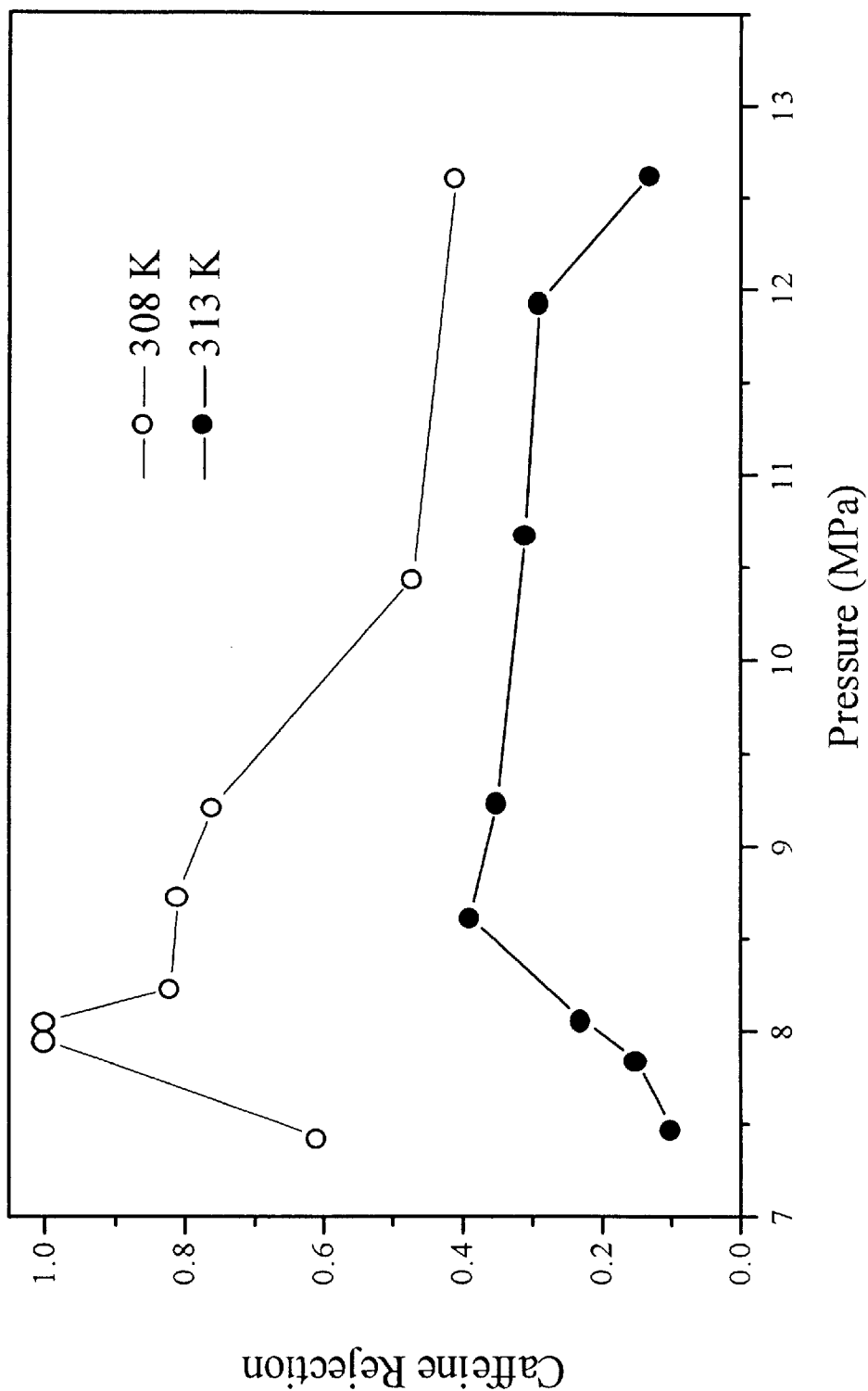
FIG. 4 is a plot showing a relationship between caffeine rejection and pressure using a nanofilter M5 having a pore size of 3 nm at 308 K (blank circle) and 313 K (round dot) according to the method of the present invention.
Figure 5:
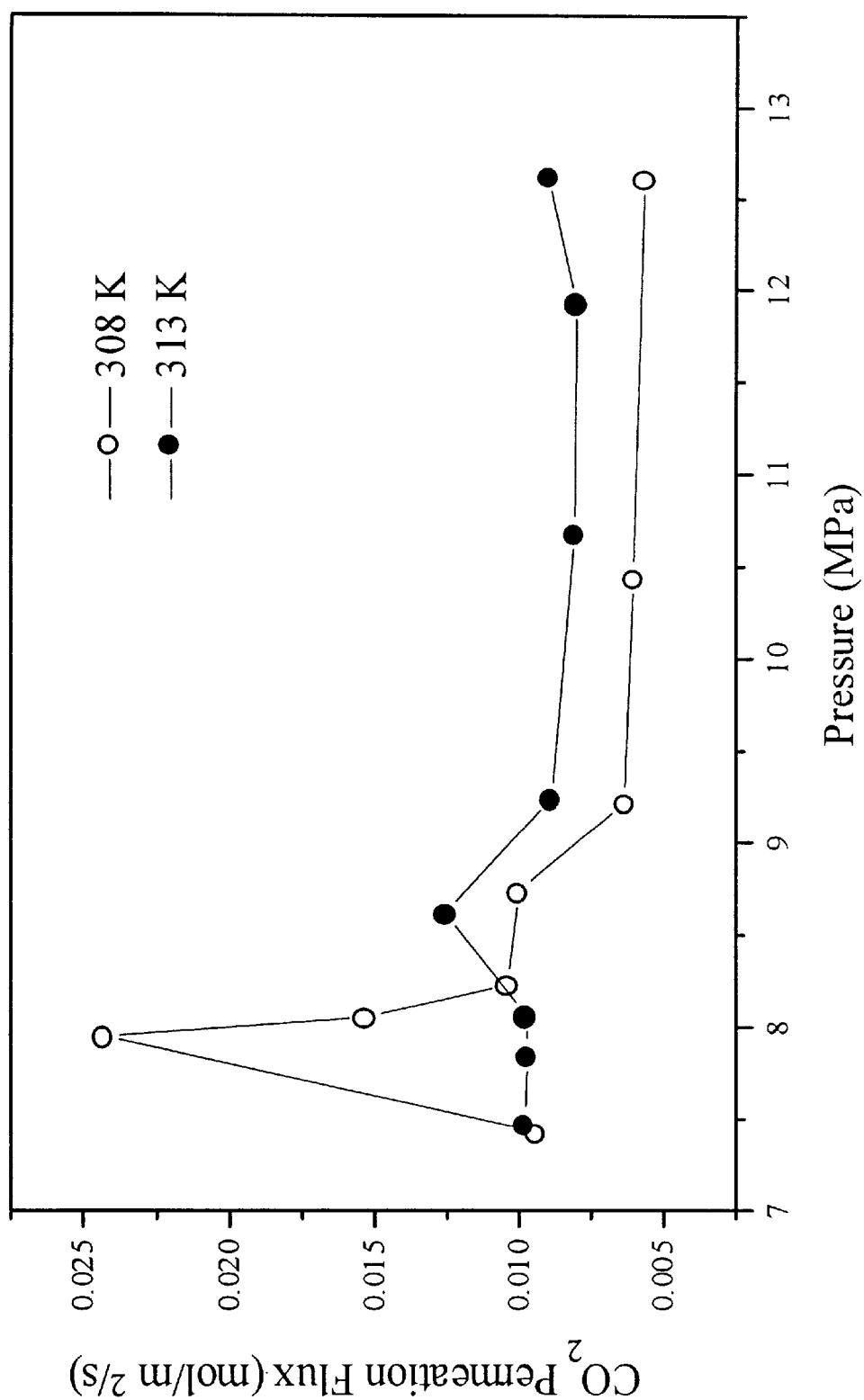
FIG. 5 is a plot showing a relationship between $CO_2$ permeation flux and pressure using a nanofilter M5 having a pore size of 3 nm at 308 K (blank circle) and 313 K (round dot) according to the method of the present invention.

When the nanofilter M5 was used, FIG. 4 shows that a 100% caffeine rejection could be obtained at the operating condition of 308 K and ca 7.95 MPa which is close to that where the highest caffeine rejection occurred using the flat sheet polycarbonate membrane. In all the runs shown in FIG. 4 $\Delta P$ was maintained at 0.2 MPa. It can also be seen from FIG. 4 that there existed a maximum caffeine rejection at each isothermal operation. The locations of the pressure where the maximum caffeine rejection occurred for the temperatures of 308 and 313 K are almost the same for the use of these two kinds of membranes. Regarding the $CO_2$ permeation flux, however, different behavior happened for these two membranes. FIG. 5 illustrates that the highest $CO_2$ permeation flux also occurred at the same pressure providing the highest caffeine rejection. This phenomenon is especially pronounced when the temperature was maintained at 308 K.

It can be seen from FIGS. 2 and 5 that the caffeine rejection can be maximized by selecting an appropriate membrane and carefully tuning the temperature and pressure in the molecular sieving separation process. It is surprised that the caffeine rejection according to the method of the present invention can be increased to 1.00 while maintaining a maximum permeation flux of the supercritical $CO_2$. Not to be bounded to the theory, we believe that the existence of a highest caffeine rejection is resulted from the presence of large clusters at operating conditions close to the critical point of $CO_2$, which are formed of a caffeine molecule surrounding by a number of $CO_2$ molecules, e.g. 80–150 $CO_2$ molecules. It might be due to that very few caffeine molecules are allowed to enter into pores because of a 100% caffeine rejection, the highest $CO_2$ permeation flux also occurs at the same operating conditions providing the highest caffeine rejection.

It is apparent that the method of the present invention can be applied to a molecular sieving separation of any solutes and any supercritical or near supercritical extractants provided that they can form clusters under the separation conditions.

What is claimed is:

1. A method for re-generating supercritical extractant from a mixture containing said supercritical extractant and a solute in said supercritical extractant comprising contacting said mixture with a molecular sieve membrane at a temperature and a pressure in a critical region of said extractant and near a critical point of said extractant so that a permeate rich in said extractant and a retentate having a enriched concentration of said solute in said extractant are generated, wherein said molecular sieve membrane has a pore size larger than a size of said extractant provided that said pore size is less than and close to sizes of clusters formed of said solute and said extractant at said temperature and said pressure.

2. The method according to claim 1, wherein said extractant is $CO_2$.

3. The method according to claim 2, wherein said solute is caffeine.

4. The method according to claim 3, wherein said membrane has a pore size about 1–5 nm.

5. The method according to claim 4, wherein a pressure drop across said membrane during said contacting is of about 0.1–0.8 MPa.

6. The method according to claim 3, wherein said temperature is of 30–50° C. and said pressure is of 7.0–9.5 MPa.

7. The method according to claim 1, wherein a solute rejection defined as $(C_{feed}-C_{permeate})/C_{feed}$ is greater than 0.8, wherein said $C_{feed}$ is a concentration of said solute in said mixture and said $C_{permeate}$ is a concentration of said solute in said permeate.

8. The method according to claim 7, wherein a solute rejection defined as $(C_{feed}-C_{permeate})/C_{feed}$ is greater than 0.9, wherein said $C_{feed}$ is a concentration of said solute in said mixture and said $C_{permeate}$ is a concentration of said solute in said permeate.

9. The method according to claim 1, wherein said solute is spice, hops, or a pesticide.

10. A method for re-generating supercritical $CO_2$ ($SCCO_2$) from a mixture containing said $SCCO_2$ and a solute in said $SCCO_2$ comprising contacting said mixture with a membrane at a temperature and a pressure in a critical region of $CO_2$ and near a critical point of $CO_2$ so that a permeate rich in $SCCO_2$ and a retentate having a enriched concentration of said solute in $SCCO_2$ are generated, wherein said membrane has a pore size about 1–5 nm.

11. The method according to claim 10, wherein said solute is caffeine.

12. The method according to claim 10, wherein said temperature is of 30–50° C. and said pressure is of 7.0–9.5 MPa.

13. The method according to claim 11, wherein said temperature is of 30–50° C. and said pressure is of 7.0–9.5 MPa.

14. The method according to claim 10, wherein a pressure drop across said membrane during said contacting is of about 0.1–0.8 MPa.

15. The method according to claim 10, wherein a solute rejection defined as $(C_{feed}-C_{permeate})/C_{feed}$ is greater than 0.8, wherein said $C_{feed}$ is a concentration of said solute in said mixture and said $C_{permeate}$ is a concentration of said solute in said permeate.

16. The method according to claim 15, wherein a solute rejection defined as $(C_{feed}-C_{permeate})/C_{feed}$ is greater than 0.9, wherein said $C_{feed}$ is a concentration of caffeine in said mixture and said $C_{permeate}$ is a concentration of caffeine in said permeate.

17. The method according to claim 10, wherein said solute is spice, hops, or a pesticide.

* * * * *